(12) United States Patent
Huang et al.

(10) Patent No.: US 8,059,952 B2
(45) Date of Patent: Nov. 15, 2011

(54) PHOTOGRAPHING MODULE

(75) Inventors: Chen Yi Huang, Taichung (TW); Te Sheng Tseng, Taichung (TW); Chao Yang Chen, Taichung (TW); Wen Hung Hsu, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/757,768

(22) Filed: Apr. 9, 2010

(65) Prior Publication Data

US 2011/0052164 A1  Mar. 3, 2011

Related U.S. Application Data

(60) Provisional application No. 61/237,151, filed on Aug. 26, 2009.

(51) Int. Cl.
*G03B 17/00* (2006.01)
(52) U.S. Cl. .......................................... 396/55
(58) Field of Classification Search ............... 396/52–55
See application file for complete search history.

(56) References Cited

U.S. PATENT DOCUMENTS

| | | | |
|---|---|---|---|
| 5,237,363 A * | 8/1993 | Okada et al. | 396/55 |
| 5,745,800 A * | 4/1998 | Kanbara et al. | 396/55 |
| 7,777,952 B2 * | 8/2010 | Homme | 359/554 |
| 2001/0022688 A1 | 9/2001 | Kosaka et al. | |
| 2006/0067660 A1 | 3/2006 | Seo | |
| 2007/0014555 A1 * | 1/2007 | Hirunuma et al. | 396/55 |
| 2008/0055421 A1 | 3/2008 | Kimura | |
| 2009/0059373 A1 * | 3/2009 | Lam et al. | 359/557 |

* cited by examiner

*Primary Examiner* — Clayton E Laballe
*Assistant Examiner* — Leon W Rhodes, Jr.
(74) *Attorney, Agent, or Firm* — Morris Manning Martin LLP; Tim Tingkang Xia, Esq.

(57) ABSTRACT

This invention provides a photographing module at least including: an electric drive assembly comprising a movable member, a holder, a magnetic circuit system and an elastic member, wherein the magnetic circuit system comprises at least three magnets and at least three coils so as to drive the movable member to perform a linear movement with respect to the optical axis and an angle of inclination with respect to at least an axis, and a magnetic pole direction of each magnet is perpendicular to the optical axis, an axis with respect to the coil winding axis of each coil is perpendicular to the optical axis; a photo sensor positioned on an image side of the photographing module and connected to the holder of the electric drive assembly; and a vibration sensor at a proper position of the photographing module capable of detecting directions and magnitude of a vibration.

8 Claims, 6 Drawing Sheets

PHOTOGRAPHING MODULE

CROSS REFERENCE TO RELATED APPLICATIONS

This nonprovisional application claims priority under 35 U.S.C. §119 (e) of U.S. Provisional Application No. 61/237,151 filed in United States of America on Aug 26, 2009. The entire contents of which are hereby incorporated by reference into the present Application.

BACKGROUND OF THE INVENTION

1. Field of the Invention

The present invention relates to a photographing module, and more particularly, to a photographing module capable of performing a movement with respect to an axis and a compensation for an angle of inclination.

2. Description of the Related Art

In recent years, with the increasing developments of consumer electronic products, the demand for digital consumer products is becoming even larger than before while product quality is becoming even more essential for consumers. Digital camera users, for example, hold higher standards towards shooting quality, hoping to capture their life moments with perfect images. However, image blurs due to vibrations caused by handheld shooting tend to occur to prior art photographing modules with an autofocus function. To avoid shooting blurred images, the user needs to use a camera stand or other tools to stabilize the camera, which is quite inconvenient in use. Therefore, a need exists in the art for an autofocus photographing module that overcomes the vibration drawback due to handheld shooting to improve image quality.

FIG. 1A shows a cross-sectional view of a prior art photographing module. The photographing module includes a yoke 101, a pad 102, a holder 107, a movable member 105, an elastic member 106, a magnetic circuit system, a photo sensor 108, and a lens unit 109. As shown in FIG. 1B, the magnetic circuit system comprises a magnet 103 and a coil 104. When a current is directed through the coil 104, the coil is electrically driven so that it will interact with the magnetic field of the magnet 103 to generate a force that drives the movable member 105 to move with respect to an axis (Z-axis) and thus achieve autofocusing.

Though the prior art photographing module can achieve autofocusing, it is not capable of providing an angle of inclination with respect to any axis. Accordingly, the compensation for an angle of inclination cannot be performed, and compensation for image blurs due to vibrations caused by handheld photo shooting cannot be performed, either. There remains a need in the art for an improved photographing module to resolve the aforementioned drawback.

SUMMARY OF THE INVENTION

One objective of the present invention is to provide an improved photographing module capable of causing a movement with respect to an axis so as to achieve autofocusing and, at the same time, providing compensation for an angle of inclination so as to correct image blurs caused by vibrations.

To achieve the above objective, the present invention provides a photographing module, at least including an electric drive assembly, a photo sensor, a vibration sensor and a lens unit, wherein the electric drive assembly at least comprises a movable member, a fixed member and an electric unit, the movable member has a hollow central portion around an optical axis of the photographing module and the fixed member has a hollow central portion around an optical axis of the photographing module for positioning the movable member, and the electric unit is located at a proper position of the photographing module and can drive the movable member to move with respect to an axis and incline at an angle with respect to at least an axis; the photo sensor is positioned on an image side of the photographing module and is connected to the fixed member; the vibration sensor is located at a proper position of the photographing module, and is capable of detecting directions and magnitude of a vibration; and the lens unit at least comprises a lens element, the lens unit is associated with the movable member.

The present invention provides another photographing module, at least including an electric drive assembly, a photo sensor, a vibration sensor and a lens unit, wherein the electric drive assembly at least comprises a holder, a movable member, a magnetic circuit system, and an elastic member; wherein the holder comprises at least three magnet accommodation spaces and a movable member accommodation space for positioning the movable member; wherein the movable member has at least three coil accommodation spaces and a hollow central portion around an optical axis of the photographing module to form a lens unit accommodation space for positioning the lens unit, and each of the magnet accommodation spaces respectively corresponds to one of the coil accommodation spaces; wherein the magnetic circuit system can drive the movable member to perform a linear movement with respect to the optical axis and an angle of inclination with respect to at least an axis, and the magnetic circuit system comprises at least three magnets and at least three coils, in which a direction of magnetic pole of each of the magnets being received by one of the magnet accommodation spaces is perpendicular to the optical axis, an axis with respect to the coil wind of each of the coils being received by one of the coil accommodation spaces and being associated with the movable member is perpendicular to the optical axis; and wherein the elastic member performs at least a linear movement with respect to an axis corresponding to movements of the moveable member, and the elastic member comprises a fixed portion, a movable portion, and a flexible portion, the fixed portion being connected to the holder, the movable portion being connected to the movable member and the flexible portion connecting between the fixed portion and the movable portion; the photo sensor is positioned on an image side of the photographing module and connected to the holder; the vibration sensor is located at a proper position of the photographing module, and is capable of detecting directions and magnitude of a vibration; and the lens unit at least comprises a lens element, the lens unit is received by the lens unit accommodation space.

The aforementioned photographing module can be implemented as another implementation, wherein the lens element in the lens unit of the photographing module is capable of being directly connected to the movable member. One skilled in the art would readily appreciate that such two implementations of the photographing module in the present invention can realize the purpose of performing a movement with respect to an axis and a compensation for an angle of inclination with respect to at least an axis.

In the aforementioned photographing module, the vibration sensor detects the directions and magnitude of a vibration and sends feedback data to the electric drive assembly. According to the feedback data, the electric drive assembly then drives the electric unit or the magnetic circuit system to create a force to drive the movable member, which can thus move with respect to an axis and/or incline at an angle with respect to at least one axis, then push forward the flexible portion of the elastic member to make the photographing module capable of providing compensation for an angle of inclination so as to correct image blurs caused by the vibration.

When the electric currents having the same current values are simultaneously directed to the three coils, the movable member can move with respect to an axis. When the electric currents having different current values are simultaneously directed to the three coils, the movable member can move with respect to an axis and incline at an angle with respect to multiple axes. When only one of the three coils is driven by the power source, the movable member can incline at an angle with respect to an axis. When two of the three coils are driven by the power source, the movable member can incline at an angle with respect to multiple axes.

DETAILED DESCRIPTION OF THE PREFERRED EMBODIMENTS

The preferred embodiments of a photographing module of the present invention will be described in detail with reference to the corresponding drawings.

Figure 1A:
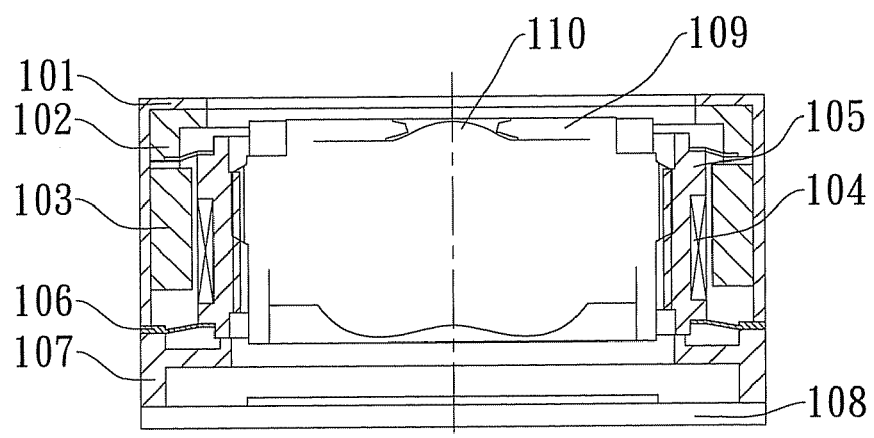
FIG. 1A shows a cross-sectional view of a prior art photographing module.
Figure 1A:
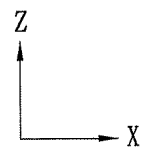
Figure 1B:
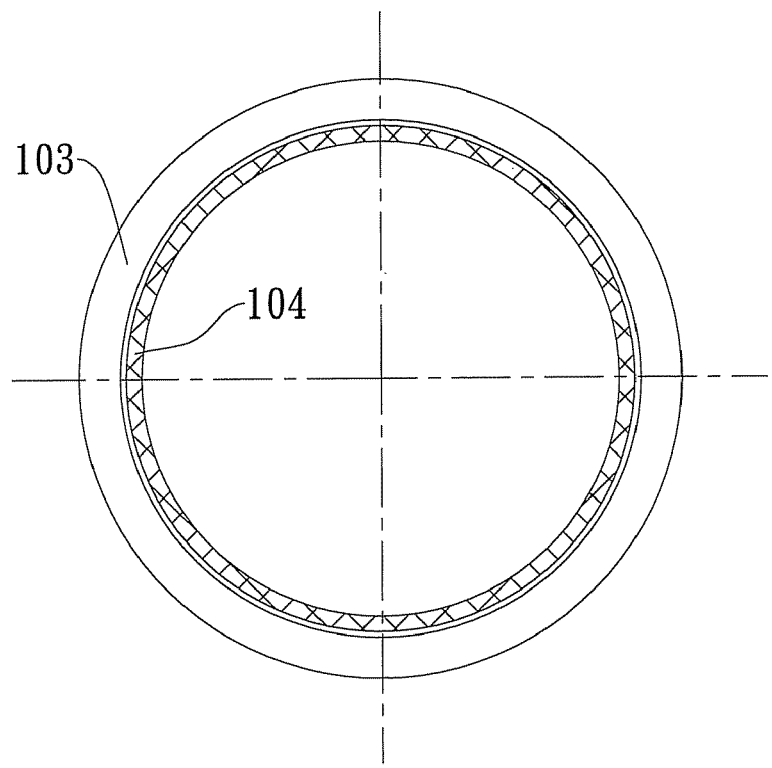
FIG. 1B shows a top view of the magnetic circuit system of the prior art photographing module shown in FIG. 1A.
Figure 1B:
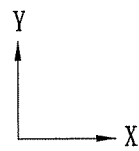
Figure 2:
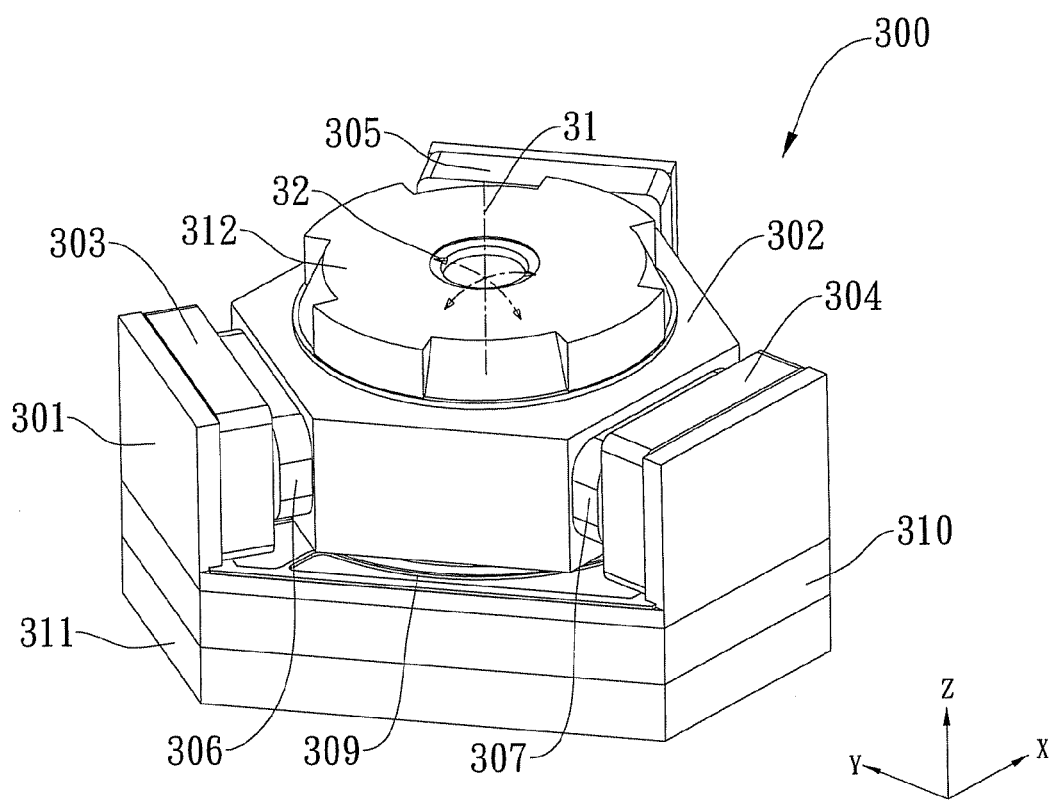
FIG. 2 shows a schematic view of a photographing module in accordance with a first embodiment of the present invention.
Figure 3:
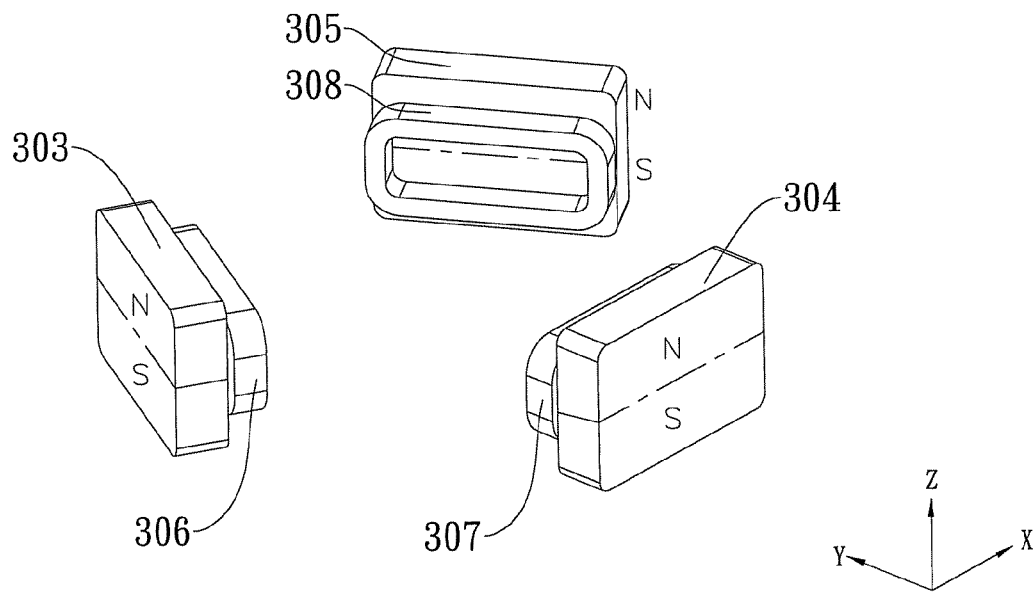
FIG. 3 shows a schematic view of the magnetic circuit system of the photographing module in accordance with the first embodiment of the present invention.
Figure 7:
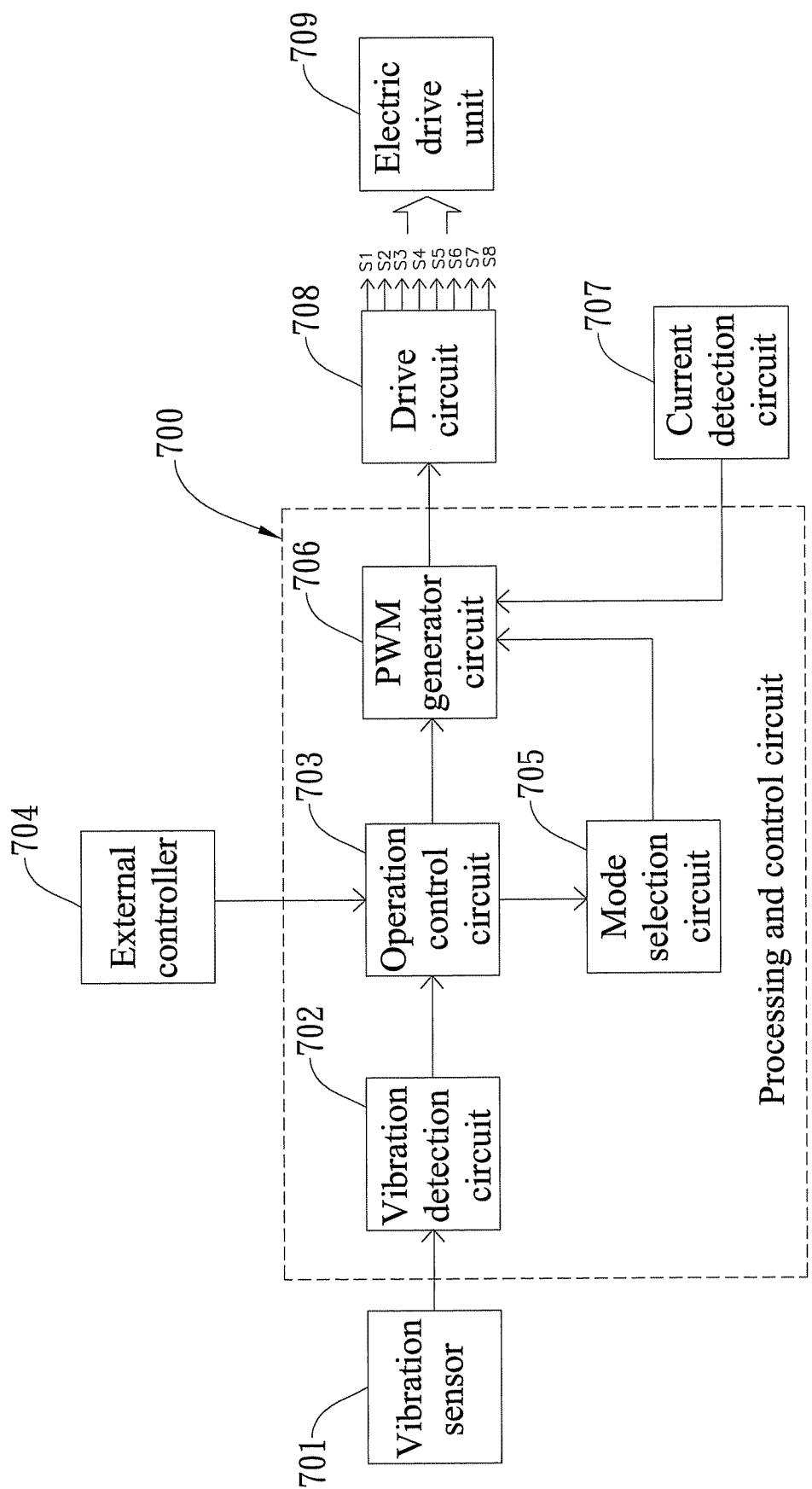
FIG. 7 is a block diagram showing the operation of the processing and control circuit in a photographing module of the present invention.

FIG. 2 shows a schematic view of a photographing module in accordance with a first embodiment of the present invention. The photographing module 300 at least includes a fixed member, a movable member 302, an electric unit, an elastic member 309, a photo sensor 310, a vibration sensor 311, and a lens unit 312. In this embodiment, the fixed member is a holder 301, and the electric unit is a magnetic circuit system, wherein the magnetic circuit system at least includes three magnets 303, 304, and 305 and three coils 306, 307, and 308 (as shown in FIG. 3). The holder 301 comprises a movable member accommodation space for receiving the movable member 302, and three magnet accommodation spaces that are evenly and symmetrically provided around the movable member 302 for receiving the magnets 303, 304, and 305 respectively. The movable member 302 has at least three coil accommodation spaces and a hollow central portion around an optical axis 31 of the photographing module 300 to form a lens unit accommodation space for positioning the lens unit 312, wherein the coils 306, 307, and 308 are received by the coil accommodation spaces respectively, and each of the magnet accommodation spaces respectively corresponds to one of the coil accommodation spaces. The elastic member 309 performs at least a linear movement with respect to an axis corresponding to the motion of the moveable member 302. The photo sensor 310 is positioned on the image side of the photographing module 300 and connected to the holder 301. The vibration sensor 311 is connected to the photo sensor 310 to detect the directions and magnitude of a vibration; however, the vibration sensor 311 may also be positioned at a proper position of the photographing module to facilitate detection. The vibration sensor 311 may be, for example, a gyro or other accelerometers. Referring to FIG. 7, after detecting the directions and magnitude of a vibration, the vibration sensor 311 sends feedback data to a processing and control circuit 700 on a circuit board of the photographing module 300. After running an algorithm, the processing and control circuit 700 drives the coils 306, 307, and 308 with proper current values and operation modes, enabling the coils 306, 307, and 308 and their corresponding magnets 303, 304, and 305 to generate a force respectively that drives the movable member 302 to move with respect to an axis and/or perform an angle of inclination 32 with respect to at least one axis. The lens unit 312 at least comprises a lens element and is received by the lens unit accommodation space of the movable member 302. Moreover, at least one lens element of the lens unit 312 may be directly connected within the movable member 302 and viewed as a part of the movable member 302.

FIG. 3 shows a schematic view of the magnetic circuit system of the photographing module 300 shown in FIG. 2 in accordance with the first embodiment of the present invention. The magnetic circuit system comprises three magnets 303, 304 and 305 and three coils 306, 307 and 308 so as to form three magnet-coil sets whereby the magnetic circuit system is evenly and symmetrically disposed around the movable member 302. The first magnet-coil set comprises the magnet 303 and the coil 306; the second magnet-coil set comprises the magnet 304 and the coil 307; the third magnet-coil set comprises the magnet 305 and the coil 308. Each of the magnets 303, 304 and 305 is received by one corresponding magnet accommodation space out of three of the holder 301. In each magnet-coil set, the directions of the top and bottom magnetic poles of the magnet are opposite and perpendicular to the axis with respect to which the coil moves, and the axis with respect to which the coil winds is perpendicular to the direction toward which the coil moves. Take the second magnet-coil set as an example, the directions of the top and bottom magnetic poles of the magnet 304 are in the Y and −Y directions, respectively, and the axis with respect to which the coil 307 winds is Y-axis. When being directed to the coil 307, an electric current may, for example but not limited to, flow through the upper portion of the coil 307 in the X direction while passing through the lower portion of the coil 307 in the −X direction, such that the upper and lower portions of the coil 307 is acted upon by a force (Lorentz Force) in the Z direction; that is, the coil 307 moves in the Z direction. As the coil 307 is associated with the movable member 302, the force further drives the movable member 302.

In the aforementioned magnetic circuit system, a power source is used to drive the three coils, enabling the three coils and the corresponding magnets to generate a force to drive the movable member 302. When the electric currents having the same current values are simultaneously directed to the three coils, the movable member 302 can move with respect to an axis. For example, when the electric currents having the same current values are simultaneously directed to the three coils 305, 306 and 307, each of the three coils 305, 306 and 307 is acted upon by a force of the same magnitude in the Z direction, thereby enabling the movable member 302 to move with respect to the Z-axis. When only one of the three coils is driven by the power source, the movable member 302 can incline at an angle with respect to an axis. For example, when the coil 306 is the only one of the three coils driven by the power source, it is acted upon by a force in the Z direction, thereby enabling the movable member 302 to incline at an angle with respect to the X-axis. When two of the three coils are driven by the power source, the movable member 302 can incline at an angle with respect to more than one axis. For example, when the coils 306 and 307 are driven by the power source, each of the coils 306 and 307 is acted upon by a force in the Z direction, thereby enabling the movable member 302 to incline at an angle with respect to the X-axis and the Y-axis at the same time. When the electric currents having different current values are directed to the three coils, the movable member 302 can move with respect to an axis and incline at an angle with respect to multiple axes. For example, when the coils 305, 306 and 307 are driven by the power source and the current values of the electric currents flowing through the coils 306 and 307 are greater than that of the electric current passing through the coil 305, each of the coils 305, 306 and 307 is acted upon by a force in the Z direction and the forces applied to the coils 306 and 307 are greater than the force applied to the coil 305, thereby enabling the movable member 302 to move with respect to the Z-axis and incline at an angle with respect to the X and Y axes at the same time. The movable member 302 can move with respect to an axis and/or incline at an angle with respect to at least one axis depending on the current values and directions of the electric currents and the selection of the coils to which the electric currents are to be directed. By driving the coils with different modes as described above, autofocusing can be achieved for the photographing module and compensation for image blurs due to vibrations caused by handheld shooting can be performed.

The aforementioned magnetic circuit system is a moving-coil system. Alternatively, the aforementioned magnetic circuit system may be embodied as a moving-magnet system by exchanging the positions of the magnet and the coil in each of the three magnet-coil sets shown in FIGS. 2 and 3. For example, the positions of the magnet 303 and the coil 306 in the first magnet-coil set are exchanged, with the magnet 303 associated with the movable member 302 and the coil 306 received by a coil accommodation space (the aforementioned magnet accommodation space is replaced with the coil accommodation space) of the holder 301. In the present invention, the holder 301, which is associated with the moving-coil system or the moving-magnet system, may be made of magnetic conductive material to increase the magnetic efficiency.

In the photographing module 300 of the present invention, the fixed member, the movable member 302, and the electric unit can be viewed as constituting an electric drive assembly of the photographing module 300, wherein the electric drive assembly of the photographing module 300 may be designed to use a voice coil motor (VCM) structure; in addition, the electric drive assembly may use an Micro-Electro-Mechanical System (MEMS) structure.

Figure 4:
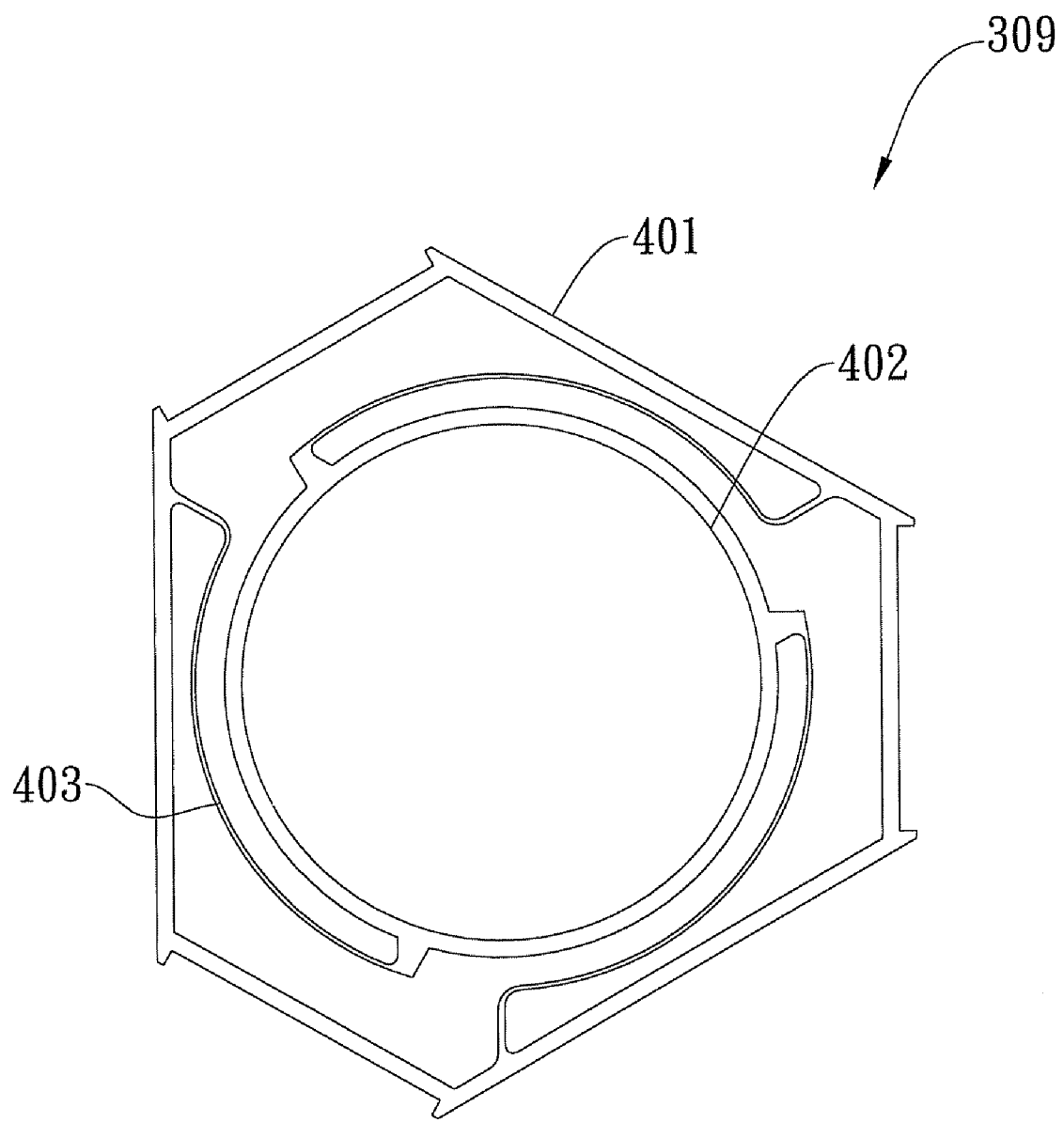
FIG. 4 shows a top view of the elastic member of the photographing module shown in FIG. 2 in accordance with the first embodiment of the present invention.

FIG. 4 shows a top view of the elastic member 309 of the photographing module 300 in accordance with the first embodiment of the present invention as shown in FIG. 2. The elastic member 309 comprises: a fixed portion 401 connected to the holder 301; a movable portion 402 connected to the movable member 302; and a flexible portion 403 connecting between the fixed portion 401 and the movable portion 402. The magnetic circuit system enables the movable member 302 to move axially and/or incline at an angle with respect to at least one axis, and thereby the movable portion 402 of the elastic member 309 can be driven to cause a linear movement of the flexible portion 403 of the elastic member 309. The elastic member 309 may be a plate spring or a coil spring with non-pre-compressed, unidirectional pre-compressed or bidirectional pre-compressed function. The elastic member 309 may also be formed as a structure having top and lower pieces or having plural pieces to increase the stability of the module.

Figure 5:
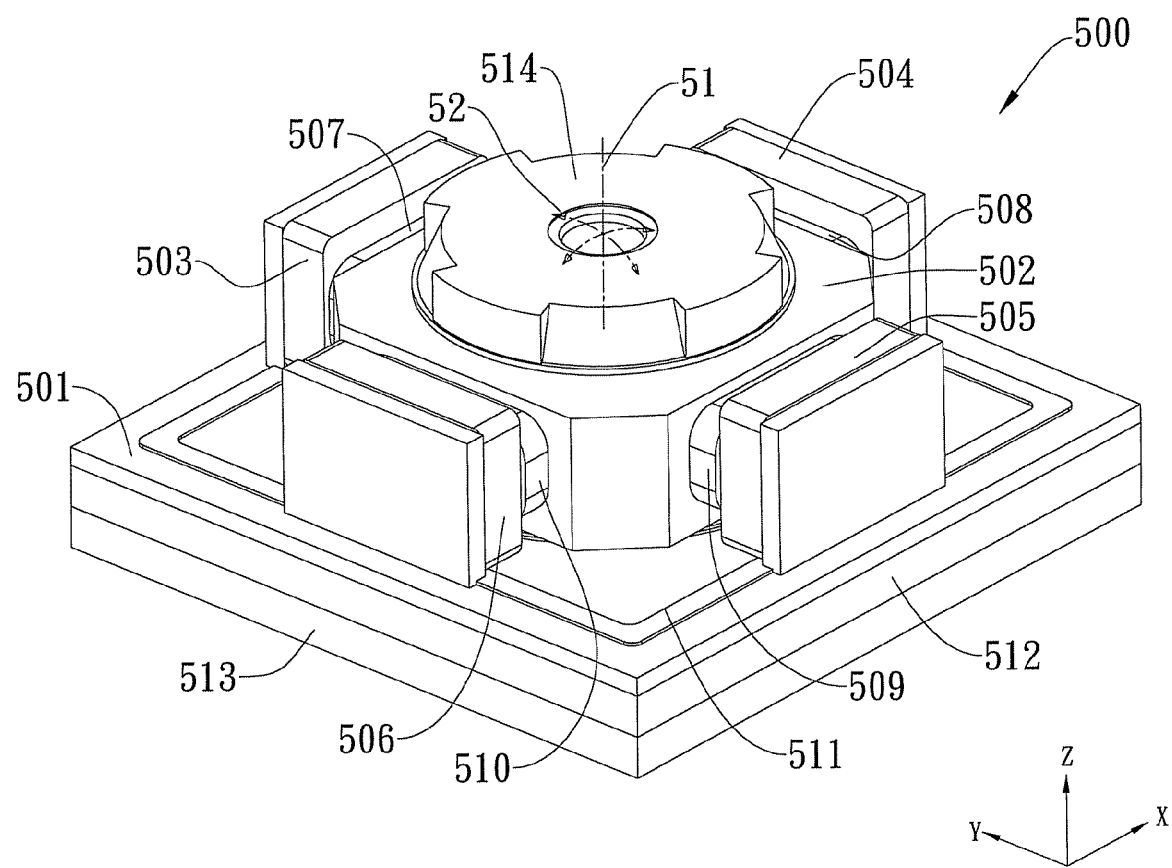
FIG. 5 shows a schematic view of a photographing module in accordance with a second embodiment of the present invention.
Figure 6:
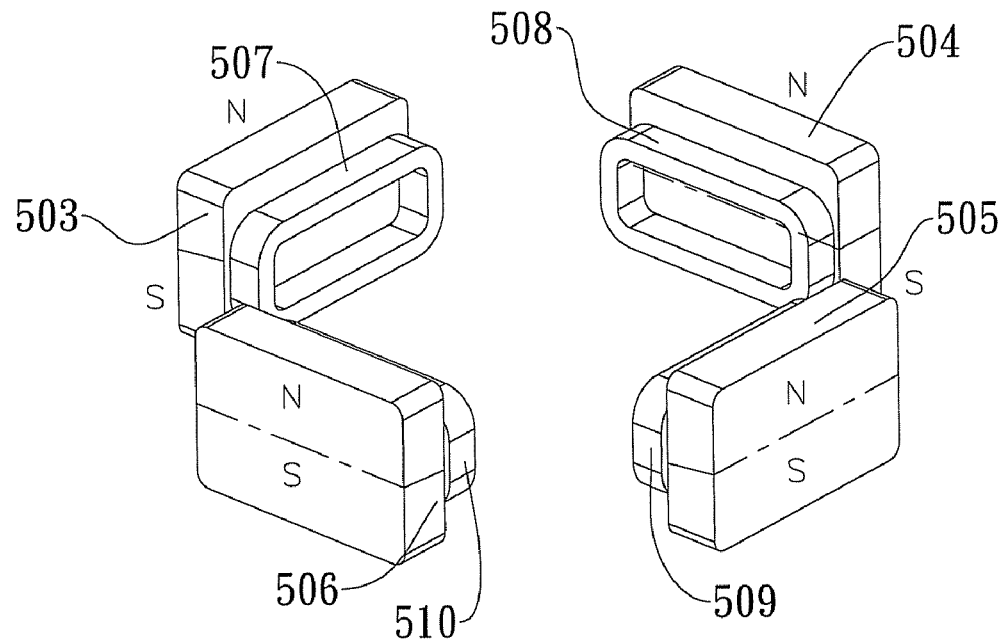
FIG. 6 shows a schematic view of the magnetic circuit system of the photographing module in accordance with the second embodiment of the present invention.

FIG. 5 shows a schematic view of a photographing module 500 in accordance with a second embodiment of the present invention. The first and second embodiments of the present invention are similar in terms of the components contained and the arrangement thereof. The two embodiments only differ in the design of the magnetic circuit systems. A photographing module 500 of the second embodiment includes a fixed member, a movable member 502, an electric unit, an elastic member 511, a photo sensor 512, a vibration sensor 513, and a lens unit 514. In this embodiment, the fixed member is a holder 501, and the electric unit is a magnetic circuit system, wherein the magnetic circuit system includes four magnets 503, 504, 505, and 506 and four coils 507, 508, 509, and 510 (as shown in FIG. 6). The holder 501 comprises a movable member accommodation space for receiving the movable member 502, and four magnet accommodation spaces that are evenly and symmetrically provided around the movable member 502 for receiving the magnets 503, 504, 505, and 506 respectively. The movable member 502 has at least four coil accommodation spaces and a hollow central portion around an optical axis 51 of the photographing module 500 to form a lens unit accommodation space for positioning the lens unit 514, in which the coils 507, 508, 509, and 510 are received by the coil accommodation spaces respectively, and each of the magnet accommodation spaces respectively corresponds to one of the coil accommodation spaces. The elastic member 511 performs at least a linear movement with respect to an axis corresponding to the motion of the moveable member 502. The photo sensor 512 is positioned on an image side of the photographing module 500 and connected to the holder 501. The vibration sensor 513 is connected to the photo sensor 512 to detect the directions and magnitude of a vibration. The vibration sensor 513 may be, for example, a gyro or other accelerometers. Referring to FIG. 7, after detecting the directions and magnitude of a vibration, the vibration sensor 513 sends feedback data to a processing and control circuit 700 on a circuit board of the photographing module 500. After running an algorithm, the processing and control circuit 700 drives the coils 507, 508, 509, and 510 with proper current values and operation modes, enabling the coils 507, 508, 509, and 510 and their corresponding magnets 503, 504, 505, and 506 to generate a force respectively that drives the movable member 502 to move with respect to an axis and/or perform an angle of inclination 52 with respect to at least one axis. The lens unit 514 at least comprises a lens element and is received by the lens unit accommodation space of the movable member 502. Moreover, the lens element of the lens unit 514 may be directly connected within the movable member 502 and viewed as a part of the movable member 502.

FIG. 6 shows a schematic view of the magnetic circuit system of the photographing module 500 shown in FIG. 5 in accordance with the second embodiment of the present invention. The magnetic circuit system comprises four magnets 503, 504, 505 and 506 and four coils 507, 508, 509 and 510 so as to form four magnet-coil sets whereby the magnetic circuit system is evenly and symmetrically disposed around the movable member 502. The first magnet-coil set comprises the magnet 503 and the coil 507; the second magnet-coil set comprises the magnet 504 and the coil 508; the third magnet-coil set comprises the magnet 505 and the coil 509; the fourth magnet-coil set comprises the magnet 506 and the coil 510. Each of the magnets 503, 504, 505 and 506 is received by one of four corresponding magnet accommodation spaces of the holder 501. The magnet circuit system can drive the movable member 502 to at least perform a movement with respect to an axis and/or incline at an angle with respect to at least one axis. The operation principal of this magnetic circuit system is the same as that of the magnetic circuit system of the first embodiment. The aforementioned magnetic circuit system is a moving-coil system. Alternatively, the aforementioned magnetic circuit system may be embodied as a moving-magnet system by exchanging the positions of the magnet and the coil in each of the four magnet-coil sets shown in FIGS. 5 and 6. For example, the positions of the magnet 503 and the coil 507 in the first magnet-coil set are exchanged, with the magnet 503 associated with the movable member 502 and the coil 507 received by a corresponding coil accommodation space (the aforementioned magnet accommodation space is replaced with the coil accommodation space) of the holder 501. In the present invention, the holder 501, which is connected to the moving-coil system or the moving-magnet system, may be made of magnetic conductive material to increase the magnetic efficiency. The elastic member 511 may also be formed as a structure having top and lower pieces or having plural pieces to increase the stability of the module.

FIG. 7 is a block diagram showing the operation of the processing and control circuit 700 in a photographing module of the present invention. In the photographing module, the vibration sensor 701 detects the directions and magnitude of a vibration, and then sends feedback data to the processing and control circuit 700. A vibration detection circuit 702 of the processing and control circuit 700 receives the data about directions and magnitude of the vibration, and further sends them to an operation control circuit 703. The operation control circuit 703 receives directions and magnitude of the vibration, for example, the direction of the vibration is moving downward, then the operation control circuit 703 outputs data to a mode selection circuit 705 after processing, wherein the data with respect to moving upward is to compensate for the vibration. Moreover, the operation control circuit 703 outputs data to a PWM (Pulse Width Modulation) generator circuit 706, wherein the data comprises driving current value. When the vibration sensor 701 detects no vibrations, data can be inputted to the operation control circuit 703 through an external controller 704 so as to perform a movement with respect to only one axis for autofocusing in the photographing module. The operation control circuit 703 receives the data from the vibration detection circuit 702 and the data from the external controller 704, the operation control circuit 703 then starts processing. After processing, the data are sent to a mode selection circuit 705. After the mode selection circuit 705 determines the mode for driving coils, the coil driving mode is sent to the PWM generator circuit 706. After the PWM generator circuit 706 receives the driving current value from the operation control circuit 703 and the coil driving mode from the mode selection circuit 705, the PWM generator circuit 706 generates corresponding pulses that are sent to a drive circuit 708, which further enables the electric drive assembly 709 to cause a movement with respect to an axis and/or inclination at an angle with respect to at least one axis. Accordingly, autofocusing and compensation for image blurs due to vibrations caused by handheld photo shooting can be achieved at the same time. A current detection circuit 707 determines whether the pulses which are sent from the PWM generator circuit 706 to the drive circuit 708 are corresponding to the desired current value and direction of vibration which are processed by the operation control circuit 703 or not. If the current value generated from the PWM generator circuit 706 is insufficient or the direction of vibration generated from the PWM generator circuit 706 is incorrect, the current detection circuit 707 informs the PWM generator circuit 706 so as to change to the correct value.

In addition, the aforementioned electric drive assembly may combine the use of two electric drive assemblies to achieve the effect of the present invention: one is an electric drive assembly having an autofocus function, and the other is an electric drive assembly that can compensate an angle of inclination. For example, an electric drive assembly having an autofocus function may use an MEMS, SMA, piezoelectric, or VCM structure; an electric drive assembly that can compensate an angle of inclination may use another MEMS, SMA, piezoelectric, or VCM structure. It is to be noted that the embodiments described herein are only illustrative and not intended to limit the scope of the present invention. A skilled person in the art would know that a photographing module achieved by a similar drive unit design shall fall within the scope of the present invention.

A photographing module of the present invention features the following advantages:

1. The coils of the photographing module can be driven independently.

2. The photographing module can provide a movement with respect to an axis and an angle of inclination with respect to an axis at the same time.

3. The photographing module can provide a movement with respect to an axis and an angle of inclination with respect to multiple axes at the same time.

4. The photographing module can provide a movement with respect to an axis and an angle of inclination with respect to one or multiple axes for the entire system.

5. The photographing module can provide an autofocus function and correct image blurs caused by vibrations.

6. The photographing module facilitates the compensation of an angle of inclination caused during the assembly of the module.

The preferred embodiments described above are exemplary and are not intended to limit the claim scope of the present invention. Various modifications and variations made within the spirit of the invention shall be considered as falling within the scope of the appended claims.

What is claimed is:

1. A photographing module, at least including an electric drive assembly, a photo sensor, a vibration sensor and a lens unit, wherein:

the electric drive assembly at least comprises a movable member, a fixed member and an electric unit, wherein the movable member has a hollow central portion around an optical axis of the photographing module and the fixed member has a hollow central portion around an optical axis of the photographing module for positioning the movable member, and the electric unit comprises at least three magnets and three coils located at a proper position of the photographing module and can drive the movable member to move with respect to an axis and incline at an angle with respect to at least an axis, wherein the directions of magnetic poles of the magnets are perpendicular to the optical axis;

the photo sensor is positioned on an image side of the photographing module and is connected to the fixed member;

the vibration sensor is located at a proper position of the photographing module, and is capable of detecting directions and magnitude of a vibration; and the lens unit at least comprises a lens element, the lens unit is associated with the movable member.

2. A photographing module, at least including an electric drive assembly, a photo sensor and a vibration sensor, wherein: the electric drive assembly at least comprises a movable member, a fixed member and an electric unit, wherein the movable member at least comprises a lens element, the fixed member has a hollow central portion around an optical axis of the photographing module, and the electric unit comprises at least three magnets and three coils located at a proper position of the photographing module and can drive the movable member to move with respect to an axis and incline at an angle with respect to at least an axis, wherein the directions of magnetic poles of the magnets are perpendicular to the optical axis;

the photo sensor is positioned on an image side of the photographing module and is connected to the fixed member; and the vibration sensor is located at a proper position of the photographing module, and is capable of detecting directions and magnitude of a vibration.

3. A photographing module, at least including an electric drive assembly, a photo sensor, a vibration sensor and a lens unit, wherein:

the electric drive assembly at least comprises a holder, a movable member, a magnetic circuit system, and an elastic member; wherein the holder comprises at least three magnet accommodation spaces and a movable member accommodation space for positioning the movable member; wherein the movable member has at least three coil accommodation spaces and a hollow central portion around an optical axis of the photographing module to form a lens unit accommodation space for positioning the lens unit, and each of the magnet accommodation spaces respectively corresponds to one of the coil accommodation spaces; wherein the magnetic circuit system can drive the movable member to perform a linear movement with respect to the optical axis and an angle of inclination with respect to at least an axis, and the magnetic circuit system comprises at least three magnets and at least three coils, wherein the direction of magnetic poles of the magnets being received by one of the magnet accommodation spaces is perpendicular to the optical axis, an axis with respect to the coil winding axis of the coils being received by one of the coil accommodation spaces and being associated with the movable member is perpendicular to the optical axis; and wherein the elastic member performs at least a linear movement with respect to an axis accompanying the moveable member's motion, and the elastic member comprises a fixed portion, a movable portion, and a flexible portion, with the fixed portion being connected to the holder, the movable portion being connected to the movable member and the flexible portion connecting between the fixed portion and the movable portion;

the photo sensor is positioned on an image side of the photographing module and connected to the holder; wherein the vibration sensor is located at a proper position of the photographing module, and is capable of detecting directions and magnitude of a vibration; and wherein the lens unit at least comprises a lens element, and the lens unit is received by the lens unit accommodation space.

4. The photographing module according to claim 3, wherein the magnetic circuit system of the photographing module is a moving coil system.

5. The photographing module according to claim 3, wherein the directions of top and bottom magnetic poles of each of the three magnets are opposite.

6. A photographing module, at least including an electric drive assembly, a photo sensor, and a vibration sensor, wherein:

the electric drive assembly at least comprises a holder, a movable member, a magnetic circuit system, and an elastic member; wherein the holder comprises at least three magnet accommodation spaces and a movable member accommodation space for positioning the movable member; wherein the movable member at least comprises a lens element and is received by the movable member accommodation space of the holder, and the movable member has at least three coil accommodation spaces, and each of the magnet accommodation spaces respectively corresponds to one of the coil accommodation spaces; wherein the magnetic circuit system can drive the movable member to perform a linear movement with respect to the optical axis and an angle of inclination with respect to at least an axis, and the magnetic circuit system comprises at least three magnets and at least three coils, wherein the direction of magnetic poles of each of the magnets being received by one of the magnet accommodation spaces is perpendicular to the optical axis, an axis with respect to the coil winding axis of each of the coils being received by one of the coil accommodation spaces and being associated with the movable member is perpendicular to the optical axis; and wherein the elastic member performs at least a linear movement with respect to an axis accompanying the moveable member's motion, and the elastic member comprises a fixed portion, a movable portion, and a flexible portion, the fixed portion being connected to the holder, the movable portion being connected to the movable member and the flexible portion connecting between the fixed portion and the movable portion;

the photo sensor is positioned on an image side of the photographing module and connected to the holder; and the vibration sensor is located at a proper position of the photographing module, and is capable of detecting directions and magnitude of a vibration.

7. The photographing module according to claim 6, wherein the magnetic circuit system of the photographing module is a moving coil system.

8. The photographing module according to claim 6, wherein the directions of top and bottom magnetic poles of each of the three magnets are opposite.

* * * * *